United States Patent [19]

Machado et al.

[11] Patent Number: 5,258,462
[45] Date of Patent: Nov. 2, 1993

[54] MISCIBLE POLYKETONE POLYMER BLEND

[75] Inventors: Joseph M. Machado, Destrehan, La.; Raymond N. French, Missouri City, Tex.

[73] Assignee: Shell Oil Company, Houston, Tex.

[21] Appl. No.: 796,957

[22] Filed: Nov. 25, 1991

[51] Int. Cl.$^5$ ............................................. C08G 67/02
[52] U.S. Cl. .................................... 525/185; 525/539
[58] Field of Search ................................ 525/185, 539

[56] References Cited

U.S. PATENT DOCUMENTS

| 4,812,522 | 3/1989 | Handlin, Jr. ................ 525/153 |
| 4,843,144 | 6/1989 | Van Broekhoven et al. ...... 528/392 |
| 4,880,903 | 11/1989 | Van Broekhoven et al. ...... 528/392 |
| 4,956,412 | 9/1990 | Gergen et al. ................ 525/190 |

FOREIGN PATENT DOCUMENTS

348206-A1 12/1989 European Pat. Off. .

Primary Examiner—James J. Seidleck
Assistant Examiner—Thomas Hamilton, III
Attorney, Agent, or Firm—Denise Y. Wolfs

[57] ABSTRACT

A miscible polymer blend composition may be formed by combining a linear alternating polymer of carbon monoxide and at least one ethylenically unsaturated hydrocarbon with a styrene/vinyl phenol copolymer containing at least about 20 mole percent vinyl phenol units.

3 Claims, No Drawings

MISCIBLE POLYKETONE POLYMER BLEND

FIELD OF THE INVENTION

This invention relates to polyketone polymer blends, and, more particularly, to miscible blends of a polyketone and styrene/vinyl phenol copolymer.

BACKGROUND OF THE INVENTION

Polyketone polymers are semi-crystalline polymers which possess an attractive set of properties for a variety of applications. The utility of these polymers can be further broadened by selectively blending polyketone polymers with other materials which have complimentary property sets.

The mixing together of two or more polymers has attracted interest as a means of arriving at new property combinations without the need to synthesize novel structures. The most common polymer blends are immiscible. In most cases, when two polymers are mixed, the components tend to segregate into separate phases, forming a non-adhering, heterogeneous mixture that exhibits inferior overall properties. In many cases, the overall property set of an immiscible blend may be improved by the addition of a suitable compatibilizer, or an agent which increases the degree of interfacial adhesion within the blend.

Occasionally, polymer pairs will form miscible blends. The term miscible describes a mixture of two or more polymers that form a single-phase solution (solid or liquid) within the amorphous phase on a molecular scale. When one or both of the polymer blend components is capable of forming both a crystalline and an amorphous phase (i.e. a semi-crystalline polymer), then the term miscible refers only to the amorphous phase in which the separate components are capable of mixing on the molecular level. Miscibility is most readily indicated by a single, composition-dependent, glass transition temperature for a blend of two or more components.

It is an object of this invention to provide a miscible blend of a polyketone polymer and a second polymer.

SUMMARY OF THE INVENTION

The present invention provides miscible polymer blends of a linear alternating polymer of carbon monoxide and at least one ethylenically unsaturated hydrocarbon (i.e. a polyketone polymer) with a copolymer of a styrene (substituted or unsubstituted) monomer and a vinyl phenol monomer (substituted or unsubstituted), wherein the copolymer contains at least about 20% vinyl phenol groups, on a molar basis. The copolymer blended with a polyketone polymer is preferably a copolymer of styrene and vinyl phenol which contains greater than about 20% vinyl phenol groups, on a molar basis. The blends of the invention are miscible over the entire spectrum of blend combinations, but preferred blends contain the polyketone polymer as a major component.

DETAILED DESCRIPTION OF THE INVENTION

Molecularly miscible blends are herein defined as blends which can be mixed such that they exhibit only one glass transition temperature, indicating a single amorphous phase. More specifically, molecularly miscible blends exhibit one glass transition temperature as measured by thermal analysis using differential scanning calorimetry. As the relative proportion of components changes, a smooth change between the glass transition temperatures for the pure blend components and the glass transition temperatures for the various blends will be observed over the miscible range for the blends.

It has been found in accordance with this invention that the desired molecularly miscible blends can be obtained by blending together a compatible mixture of a polyketone polymer with a styrene/vinyl phenol random copolymer, which contains at least about 20 mole percent vinyl phenol units.

The polyketone polymers present as the major component in the blends of the invention are of a linear alternating structure and contain substantially one molecule of carbon monoxide for each molecule of unsaturated hydrocarbon. Ethylenically unsaturated hydrocarbons suitable for use as monomers in the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic, containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, preferably an α-olefin such as propylene.

When the preferred polyketone terpolymers are employed as the major polymeric component of the blends of the invention, there will be within the terpolymer at least about 2 units derived from a monomer of ethylene for each unit derived from a monomer of the second hydrocarbon. Preferably, there will be from about 10 units to about 100 units derived from a monomer of ethylene for each unit derived from a monomer of the second hydrocarbon. The polymer chain of the preferred polyketone polymers has recurring units represented by the formula

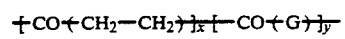

wherein G is derived from the monomer of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO—(—CH₂CH₂—)— units and the —CO—(—G—)— units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent, so the polymers are fairly represented by the formula for the polymer chain as depicted above.

Of particular interest are the polyketone polymers of number average molecular weight from about 1000 to about 200,000, particularly those of number average molecular weight from about 20,000 to about 90,000, as determined by gel permeation chromatography. The physical properties of the polymer will depend in part upon the molecular weight, whether the polymer is a copolymer or a terpolymer and, in the case of terpolymers, the nature and proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

U.S. Pat. No. 4,880,903 (Van Broekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt, or nickel, the anion of a strong non-hydrohalogenic acid, and a bidentate ligand of phosphorus, arsenic or antimony. U.S. Pat. No. 4,843,144 (Van Broekhoven et al.) discloses a process for preparing polymers of carbon monoxide and at least one ethylenically unsaturated hydrocarbon using a catalyst comprising a compound of palladium, the anion of a non-hydrohalogenic acid having a pKa of below about 6 and a bidentate ligand of phosphorus.

The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The catalyst composition may be formed from a variety of materials, but without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)-phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated, for example, as by cooling the reactor and contents and releasing the pressure. The polyketone polymer is typically obtained as a product substantially insoluble in the reaction diluent and the product is recovered by conventional methods, such as filtration or decantation. The polyketone polymer is used as recovered or the polymer is purified, for example, by contact with a solvent or extraction agent which is selective for catalyst residues.

The second component of the blends of the invention is a copolymer of units derived from a styrene monomer, with or without substitution, and units derived from a vinyl phenol monomer, with or without substitution. The copolymers typically have a vinyl phenol repeat unit content of at least about 20% on a molar basis (20 mol %), based on total moles of repeat units.

The styrene monomer repeat unit of the copolymer is represented by the following formula:

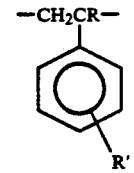

wherein R and R' independently are hydrogen or alkyl of up to 2 carbon atoms inclusive. Illustrative styrene compounds are styrene, α-methylstyrene, α-ethylstyrene, α-methylstyrene, and p-ethylstyrene, and mixtures thereof. Styrene and α-methylstyrene are preferred, and styrene is particularly preferred.

Styrene monomer useful for the production of polymers may be prepared, for example, by dehydrogenation of ethylbenzene in the presence of steam and a catalyst of iron oxide promoted with potassium and chromium oxides. Styrene, along with a coproduct, may also be manufactured by oxidation of ethylbenzene. Crude styrene is refined by distillation under conditions controlled to prevent premature polymerization.

The vinyl phenol monomer repeat unit of the copolymer is represented by the following formula:

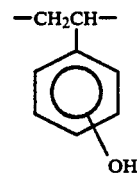

The vinyl phenol monomers may be ortho-, meta- or para-vinyl phenols, and mixtures thereof, and may be non-substituted or include additional groups of up to 2 carbon atoms inclusive on the aromatic ring. The preferred vinyl phenol monomers are non-substituted, with the hydroxyl radical in the para position.

Vinyl phenols useful for the production of polymers may be prepared, for example, by hydrolysis of commercially available coumarin or substituted coumarins, followed by decarboxylation of the resulting hydroxy cinnamic acids. Useful vinyl phenols may also be prepared by dehydration of the corresponding hydroxyl alkyl phenols or by decarboxylation of hydroxy cinnamic acids resulting from the reaction of substituted or non-substituted hydroxybenzaldehydes with malonic acid.

High purity para-vinyl phenol polymers may be prepared by several methods known in the art. A high purity para-vinyl phenol polymer may be produced by polymerizing para-vinyl phenol in the presence of phenols without unsaturated side chains, and in the presence of a polymerization accelerator. High purity para-vinyl phenol may also be produced by dehydrogenating crude para-ethylphenol, polymerizing the resulting crude para-vinyl phenol without purification, and then purifying the resulting polymerization product. Hoechst Celanese commercially produces a high purity para-vinyl phenol polymer by polymerization of a high purity para-acetoxystyrene monomer, followed by hydrolysis to para-vinyl phenol polymer.

The copolymers of styrene and vinyl phenol can be prepared using conventional free radical polymerization techniques. A preferred method is by copolymerizing styrene monomer and para-acetoxystyrene monomer, followed by hydrolysis to convert the para-acetoxystyrene repeat units into para-vinyl phenol repeat units.

The amount of vinyl phenol repeat unit present in the styrene/vinyl phenol copolymer is to some extent dependent on the type of styrene monomer from which the styrene repeat units present in the copolymer are derived. In general, the amount of vinyl phenol repeat units present is at least about 20 mol % and preferably at least about 25 mol % based on total moles of repeat units. For copolymers derived from monomers of unsubstituted styrene and vinyl phenol, the vinyl phenol repeat unit content is at least about 20 mol %, and preferably at least about 25 mol %. The preferred amount of vinyl phenol repeat units present in the copolymers derived from monomers of substituted styrene and vinyl phenol is, to some extent, determined by the nature of the styrene substituent(s). For example, o-methylstyrene may require at least about 30 mol % vinyl phenol repeat units in the copolymer, while $\alpha$-ethylstyrene may require at least about 36 mol % vinyl phenol repeat units in the copolymer to ensure miscibility with a polyketone polymer. For copolymers derived from monomers of substituted styrene and vinyl phenol, the vinyl phenol repeat unit content is at least about 30 mol %, and preferably at least about 35 mol %, based on total moles of repeat units. For any copolymer, the amount of vinyl phenol repeat unit present is less than the amount that would render the copolymer to be, in effect, a vinyl phenol homopolymer. The styrene and vinyl phenol repeat units are distributed approximately randomly within the copolymer. The degree of randomness which is required for the purposes of this invention is that which is sufficient to prevent microphase separation within the copolymer itself. Polymerization with a free radical initiator yields a copolymer whose repeat unit sequence distribution is essentially random.

The relative amounts of the polyketone polymer and the styrene/vinyl phenol copolymer will vary depending upon the expected use for the polymer blend. Miscibility is expected across the entire spectrum of blends. Preferred compositions contain the polyketone polymer as a major component. A preferred blend contains from about 5 wt % to about 35 wt % of the styrene/vinyl phenol copolymer. Particularly preferred are blends containing from about 5 wt % to about 25 wt % of the styrene/vinyl phenol copolymer.

Non-miscible blends of a polyketone polymer and a copolymer of a vinyl aromatic monomer and an alkenyl nitrile monomer are disclosed in U.S. Pat. No. 4,956,412 (Gergen et al.). Miscible blends of a polyketone polymer and a poly(vinyl phenol) polymer are disclosed in U.S. Pat. No. 4,812,522 (Handlin).

The blends of the invention may also include additives such as antioxidants and stabilizers, dyes, fillers or reinforcing agents, fire resistant materials, mold release agents, colorants and other materials designed to improve the processability of the polymers or the properties of the resulting blend. Such additives are added prior to, together with or subsequent to the blending of the polyketone and the copolymer.

The method of producing the blends of the invention is not material so long as a miscible blend is produced without undue degradation of the blend or its components. In one modification the polymer components of the blend are extruded in a corotating twin screw extruder to produce the blend. In an alternate modification, the polymer components are blended in a mixing device which exhibits high shear. The blends are processed by methods such as extrusion and injection molding into sheets, films, plates and shaped articles. Illustrative applications are the production of articles useful in both rigid and flexible packaging, both internal and external parts for the automotive industry, and structural parts for the construction industry.

The invention is further illustrated by the following Examples which should not be regarded as limiting.

EXAMPLE 1

A linear alternating terpolymer of carbon monoxide, ethylene, and propylene (89/035) was produced in the presence of a catalyst composition formed from palladium acetate, trifluoroacetic acid and 1,3-bis[di(2-methoxyphenyl)-phosphino]propane. The polyketone polymer had a melting point of about 220° C. and an LVN of about 1.8 dl/g when measured in m-cresol at 60° C. The polyketone polymer also contained conventional additives.

EXAMPLE 2

Blends were prepared of the polyketone terpolymer of Example 1 and a styrene/vinyl phenol (SVP) copolymer containing about 35 mol % vinyl phenol repeat units, an experimental material obtained from Hoechst-Celanese. The SVP was a random copolymer, prepared by free radical polymerization, with a weight-average molecular weight of about 56,000. The blends and neat polymer control samples were prepared by melt compounding on a Baker-Perkins co-rotating twin screw extruder operating at about 300 RPM and a melt temperature of about 250° C. The blends prepared are listed in Table 1. Test specimens of the blends were compression molded at 240° C. and stored over dessicant prior to analysis.

The samples were then subjected to thermal analysis using a Seiko differential scanning calorimeter (DSC). The samples were scanned from −100° C. to 250° C. at a rate of 20° C./min. They were then quenched to −100° C. and rescanned to 250° C. at 20° C./min. The glass transition temperature for each sample was calculated upon the second heating. The glass transition temperatures for the blends, as determined by DSC, are reported in Table 1.

The samples were also subjected to dynamic mechanical testing (DMT). The glass transition temperature of the blends was determined by the temperature at which the dynamic mechanical loss tangent, tan delta, reached a maximum value in mechanical torsion at 1 Hz frequency and low strain amplitude. The pure SVP sample was too brittle for DMT analysis. The glass transition temperatures, as determined by DMT, are reported in Table 1.

TABLE 1

| Composition (Polyketone/SVP) | Glass Transition Temperature (°C.) DMT | DSC |
|---|---|---|
| 100/0 | 16 | 12.7 |
| 90/10 | — | 31.1 |
| 80/20 | 66 | 40.8 |
| 70/30 | 70 | 39.7 |
| 0/100 | — | 124.7 |

The miscibility of as much as 30 wt % SVP in polyketone was demonstrated by the glass transition temperatures for the blends. The blends within this range each exhibited a single glass transition, the temperature of which increases in a nearly linear fashion from the glass transition temperature of polyketone to the glass transition temperature of SVP, based on the relative proportions of the blend components.

The glass transition temperatures determined by dynamic mechanical methods are always somewhat higher than those determined by calorimetric methods, because of differences in the characteristic rate of the test. However, the glass transitions from both methods follow the same trend.

This is evidence of a single amorphous phase consisting of the SVP copolymer (which is entirely amorphous) and the amorphous fraction of polyketone. The crystalline phase of the blend consists entirely of polyketone segments.

The miscibility observed for this pair of polymers implies that high quality blends can be prepared having properties which are intermediate between those of a tough polyketone and a stiff styrenic copolymer.

What is claimed is:

1. A composition comprising a miscible blend of:
   a polyketone terpolymer having recurring units represented by the formula

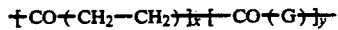

wherein G is derived from a monomer of an ethylenically unsaturated hydrocarbon of at least 3 carbon atoms polymerized through the ethylenic unsaturation and the ratio of y:x is no more than about 0.5, and
   a copolymer of repeat units derived from an unsubstituted styrene monomer, and repeat units derived from an unsubstituted vinyl phenyl monomer, wherein the copolymer contains about 35 mol % repeat units derived from vinyl phenol, based on total moles of repeat units.

2. The composition of claim 1 wherein, in the polyketone terpolymer, G is derived from a monomer of propylene and the ration of y:x is from about 0.01 to about 0.1.

3. The composition of claim 1 wherein the vinyl phenol monomer is a para-vinyl phenol monomer.

* * * * *